(12) United States Patent
Ikeda

(10) Patent No.: US 10,864,691 B2
(45) Date of Patent: Dec. 15, 2020

(54) TOOTHED BELT AND MANUFACTURING METHOD THEREFOR

(71) Applicant: Mitsuboshi Belting Ltd., Hyogo (JP)

(72) Inventor: Makoto Ikeda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 152 days.

(21) Appl. No.: 16/301,919

(22) PCT Filed: May 24, 2017

(86) PCT No.: PCT/JP2017/019375
§ 371 (c)(1),
(2) Date: Nov. 15, 2018

(87) PCT Pub. No.: WO2017/204250
PCT Pub. Date: Nov. 30, 2017

(65) Prior Publication Data
US 2020/0198268 A1 Jun. 25, 2020

(30) Foreign Application Priority Data

May 25, 2016 (JP) .................................. 2016-104344
May 16, 2017 (JP) .................................. 2017-097103

(51) Int. Cl.
*B29D 29/08* (2006.01)
*F16G 1/28* (2006.01)

(52) U.S. Cl.
CPC ............. *B29D 29/08* (2013.01); *F16G 1/28* (2013.01)

(58) Field of Classification Search
CPC .. F16G 1/28; F16G 5/20; B29D 29/08; C08G 18/10; B29C 2021/00
(Continued)

(56) References Cited

U.S. PATENT DOCUMENTS 3,335,843 A * 8/1967 Duvivier et al. ....... B32B 15/08
198/847
3,535,946 A * 10/1970 Miller ....................... F16G 1/28
474/205
(Continued)

FOREIGN PATENT DOCUMENTS

CN 1172725 A 2/1998
CN 104053538 A 9/2014
(Continued)

OTHER PUBLICATIONS

Nov. 19, 2019—(CN) Notification of First Office Action—App 201780030990.5.
(Continued)

*Primary Examiner* — Henry Y Liu
(74) *Attorney, Agent, or Firm* — Banner & Witcoff, Ltd.

(57) ABSTRACT

The present invention relates to a toothed belt (1) containing: a belt main body (2) containing an array of a cord, a tooth portion (2b) formed on the lower side of the array of the cord and arranged at a predetermined interval along a longitudinal direction of the cord, and a back surface portion (2a) formed on the upper side of the array of the cord and having the cord buried therein, which are integrally molded with a first thermoplastic elastomer composition; and a back sheet (3) adhered to the back surface portion side of the belt main body (2) and composed of a second thermoplastic elastomer composition, in which the back sheet (3) has an uneven shape (6) in a surface on the adhesion side.

5 Claims, 5 Drawing Sheets

(58) Field of Classification Search
USPC .......................................................... 474/205
See application file for complete search history.

(56) References Cited

U.S. PATENT DOCUMENTS

| | | | | |
|---|---|---|---|---|
| 4,228,692 | A * | 10/1980 | Jacob | F16G 5/08 156/139 |
| 4,311,474 | A * | 1/1982 | Standley | F16G 1/28 156/137 |
| 4,445,879 | A * | 5/1984 | Cicognani | F16G 1/28 474/205 |
| 4,504,342 | A * | 3/1985 | Marsh | B29D 29/08 156/138 |
| 4,583,963 | A * | 4/1986 | Marsh | F16G 1/28 474/205 |
| 4,586,973 | A * | 5/1986 | Marsh | F16G 1/28 156/137 |
| 4,626,232 | A * | 12/1986 | Witt | F16G 1/28 474/205 |
| 4,838,843 | A * | 6/1989 | Westhoff | B29D 29/08 474/205 |
| 5,306,213 | A * | 4/1994 | Nakajima | B29D 29/08 474/205 |
| 5,614,267 | A * | 3/1997 | Howlett | B05D 1/08 427/447 |
| 5,807,194 | A * | 9/1998 | Knutson | B29D 29/08 474/268 |
| 5,971,879 | A * | 10/1999 | Westhoff | B32B 5/26 474/260 |
| 6,260,887 | B1 | 7/2001 | Fujii et al. | |
| 7,926,649 | B2 * | 4/2011 | Goser | B29D 29/00 198/847 |
| 8,070,634 | B2 * | 12/2011 | Gaynor | F16H 55/171 474/153 |
| 8,192,315 | B2 * | 6/2012 | Westelaken | F16G 5/20 474/238 |
| 8,469,846 | B2 * | 6/2013 | Westelaken | F16G 5/20 474/238 |
| 2001/0035257 | A1 | 11/2001 | Fujii et al. | |
| 2007/0249451 | A1 | 10/2007 | Wu et al. | |
| 2010/0216583 | A1 * | 8/2010 | Westelaken | F16G 5/20 474/238 |
| 2011/0129647 | A1 * | 6/2011 | Duke, Jr. | C08J 5/046 428/156 |
| 2013/0153126 | A1 | 6/2013 | Knox et al. | |
| 2013/0337956 | A1 | 12/2013 | Motozaki et al. | |
| 2014/0190622 | A1 | 7/2014 | Knox et al. | |
| 2015/0083605 | A1 | 3/2015 | Tamura et al. | |
| 2015/0182386 | A1 | 7/2015 | Nakakado | |

FOREIGN PATENT DOCUMENTS

| | | |
|---|---|---|
| CN | 104334773 A | 2/2015 |
| CN | 104487035 A | 4/2015 |
| JP | S55-170540 U | 12/1980 |
| JP | S57-043039 A | 3/1982 |
| JP | S62-024853 Y2 | 6/1987 |
| JP | H06-094178 A | 4/1994 |
| JP | H09-042381 A | 2/1997 |
| JP | H11-070589 A | 3/1999 |
| JP | 2009-112217 A | 5/2009 |
| JP | 2009-127816 A | 6/2009 |
| JP | 2014-001777 A | 1/2014 |
| JP | 2015-003821 A | 1/2015 |
| TW | 200745461 A | 12/2007 |

OTHER PUBLICATIONS

Dec. 4, 2019—(EP) Extended Search Report—App 17802836.1.
Dec. 4, 2018—(CA) Office Action—App 3,020,579.
Aug. 1, 2017—International Search Report—Intl App PCT/JP2017/019375.
Nov. 23, 2017—(TW) Office Action—App 106117379.
May 7, 2019—(JP) Notification of Reasons for Refusal—App 2017-097103.
Aug. 19, 2019—(CA) Office Action—App 3,020,579.
Feb. 18, 2020—(KR) Office Action—App 10-2018-7033392.

* cited by examiner

[FIG. 1]
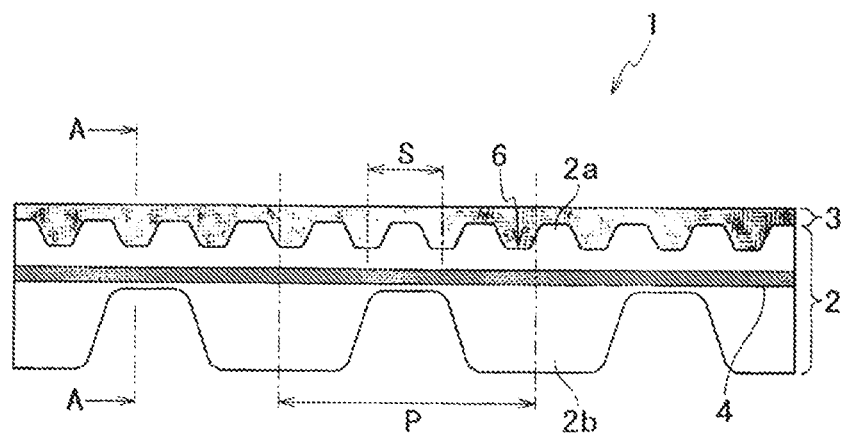
[FIG. 2]
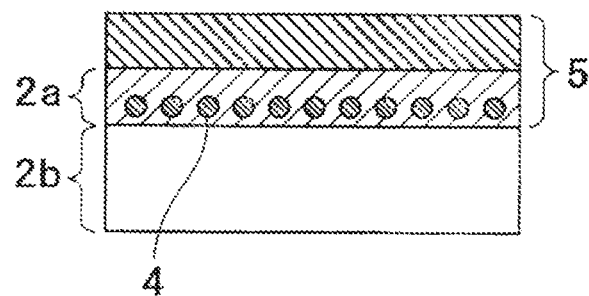

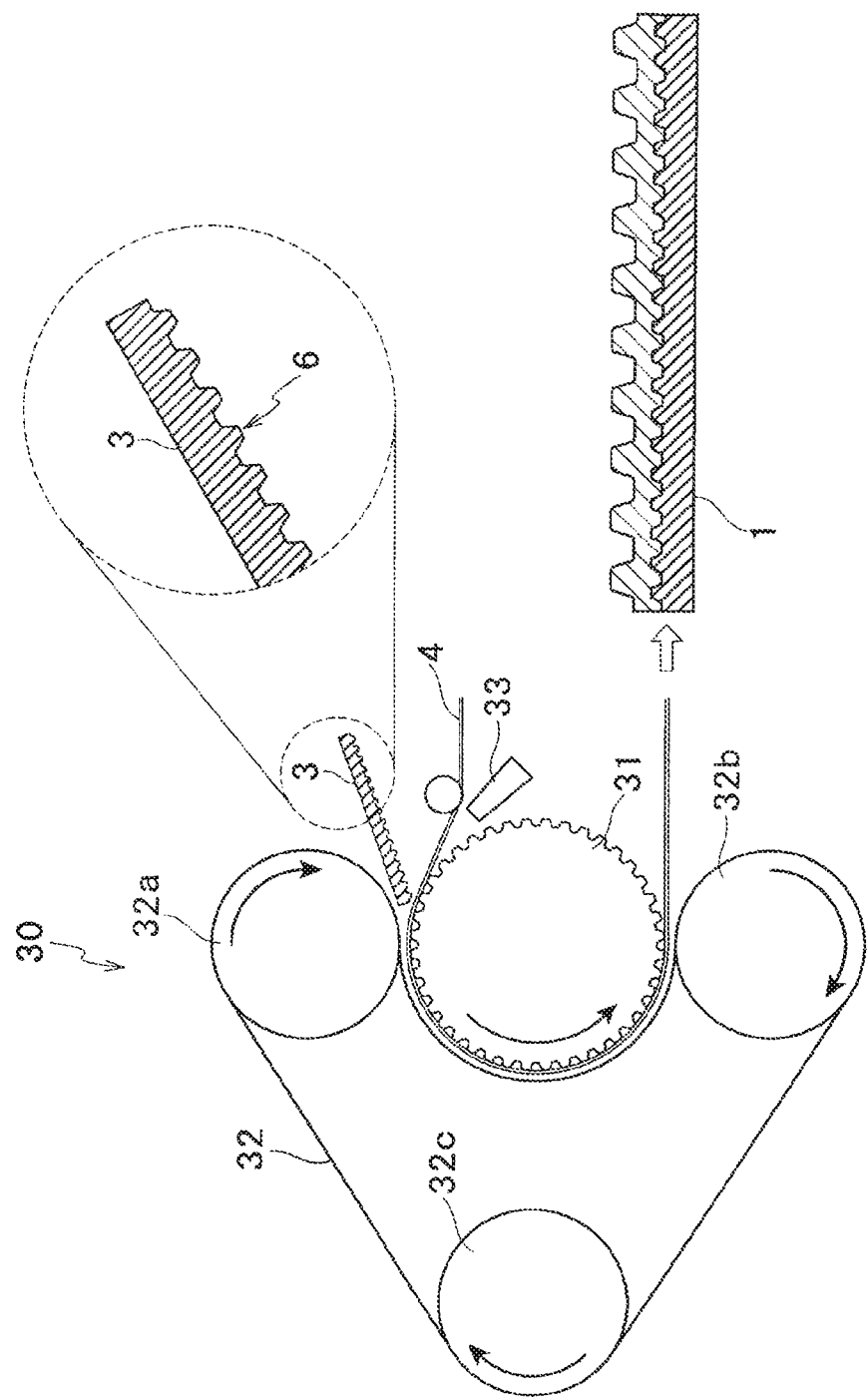
[FIG. 3]

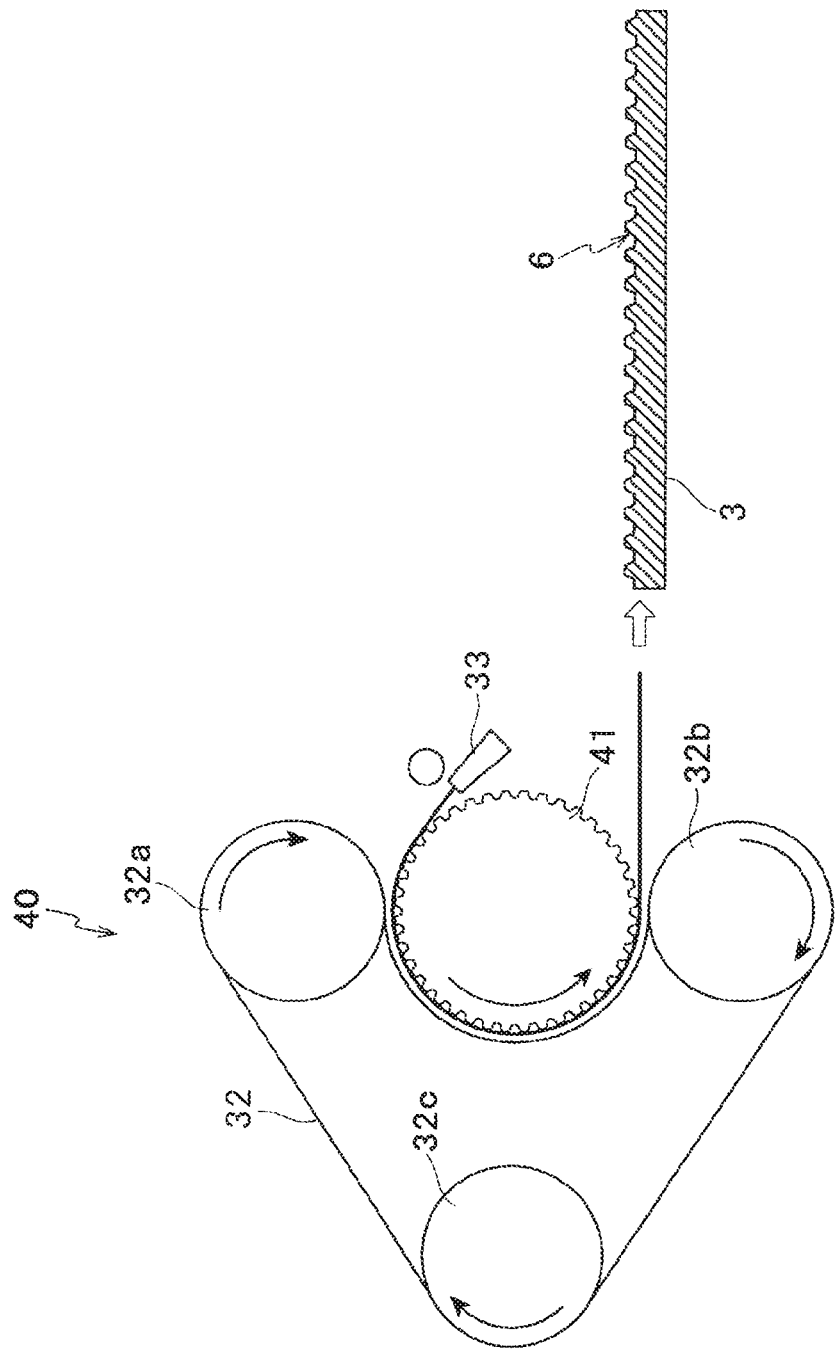
[FIG. 4]

[FIG. 5]
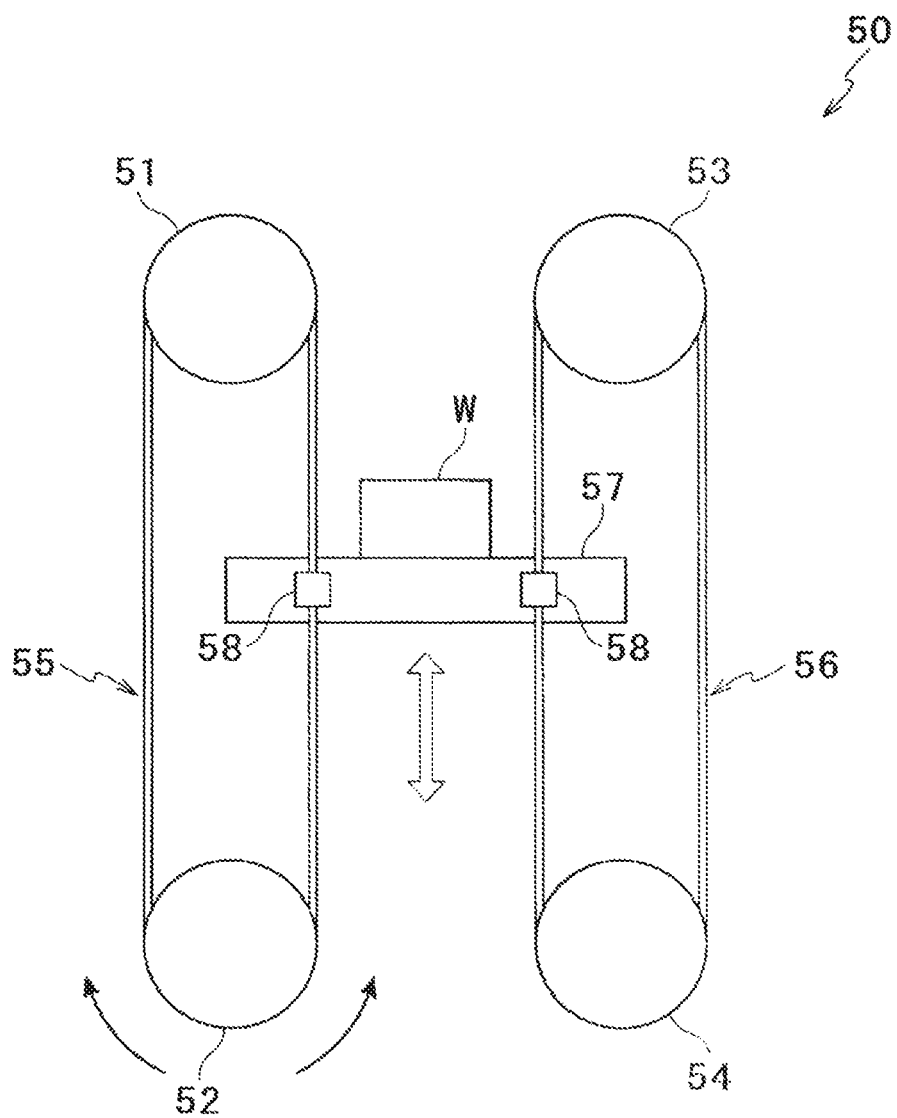

[FIG. 6]
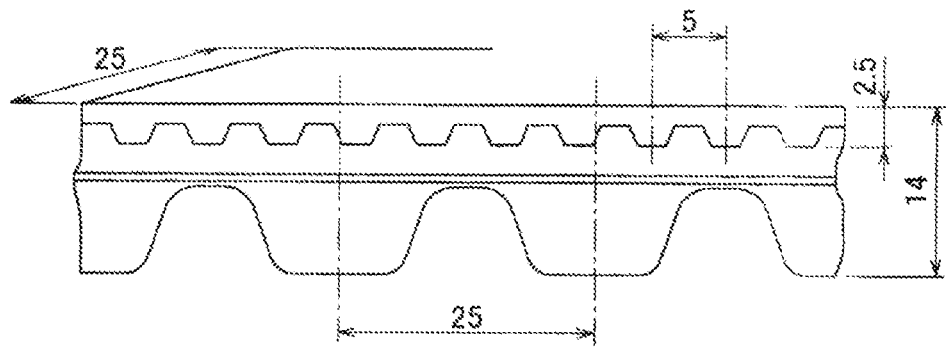
[FIG. 7]
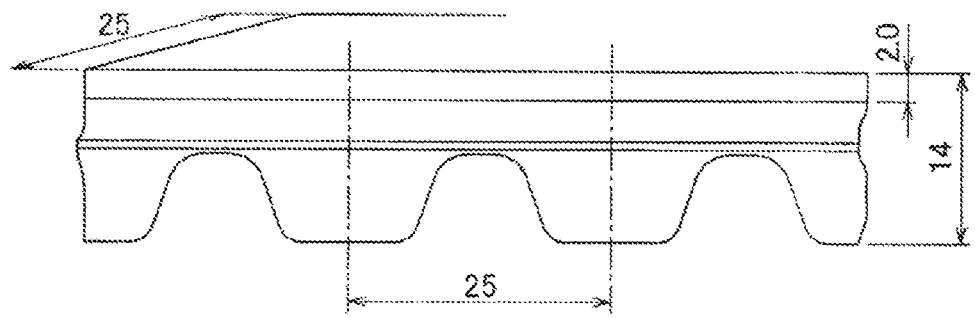

TOOTHED BELT AND MANUFACTURING METHOD THEREFOR

CROSS REFERENCE TO RELATED APPLICATIONS

This is a U.S. National Phase Application under 35 U.S.C. § 371 of International Application No. PCT/JP2017/019375, filed May 24, 2017, which claims priority to Japanese Application Nos. 2016-104344 filed May 25, 2016 and 2017-097103 filed May 16, 2017, which was published Under PCT Article 21(2), the entire contents of which are incorporated herein by reference.

TECHNICAL FIELD

The present invention relates to a toothed belt made of a thermoplastic elastomer and a manufacturing method thereof.

BACKGROUND ART

A toothed belt is used in a synchronous transmission system for transmitting rotation without slipping. For this reason, the toothed belts made of rubber or made of a thermoplastic elastomer have been widely used as power transmission belts for general industry, for a precision instrument and the like. Among them, a long toothed belt is highly demanded for applications such as an automatic door, an industrial transport device, and an automatic warehouse.

Such a long toothed belt is continuously formed by using a thermoplastic elastomer by extrusion molding. Next, the molded body is cut to have a required length and both ends are joined to make it endless. As an example of the method for manufacturing a thermoplastic elastomer-made toothed belt by an extrusion molding, techniques disclosed in PTLs 1 and 2 are mentioned.

The molding method disclosed in PTL 1 includes a step of allowing a melted thermoplastic elastomer material to flow from one of the tooth side and back side of cords and to pass through intervals between the cords, to thereby fill the other side.

The molding method in a first Example disclosed in PTL 2 includes a first step of allowing a melted thermoplastic elastomer to flow to be shaped into a thermoplastic elastomer sheet, a second step of allowing a melted thermoplastic elastomer to flow with respect to the thermoplastic elastomer sheet and cords to form a thermoplastic elastomer sheet with cords, and a third step of allowing a melted thermoplastic elastomer to flow with respect to the thermoplastic elastomer sheet with cords to form a tooth portion.

The molding method in a second Example disclosed in PTL 2 includes a first step of allowing a melted thermoplastic elastomer to flow with respect to cords to form a thermoplastic elastomer sheet with cords in which one surface of the cords are coated with the thermoplastic elastomer, and a second step of allowing a melted thermoplastic elastomer to flow on both surfaces of the thermoplastic elastomer sheet with cords to form a tooth portion and a back portion.

CITATION LIST

Patent Literature

PTL 1: JP-A H06-94178
PTL 2: JP-A H11-70589

SUMMARY OF INVENTION

Technical Problem

For example, examples of using a toothed belt made of a thermoplastic elastomer include a lifting and transporting apparatus that reciprocates in a certain range as illustrated in FIG. 5.

In the toothed belt used in such a lifting and transporting apparatus, a shaft member (fixture) for connecting a loading platform is inserted into a belt back portion in order to connect and fix the loading platform with the toothed belt. In this use, the belt back portion is required to be thickened.

In the molding method disclosed in PTL 1, a melted thermoplastic elastomer material is allowed to flow from one of the tooth side and back side of cords and to pass through an interval between the cords, to thereby fill the other side. Therefore, in the case of molding a belt having a large thickness of the back portion as described above, there is a problem in that the thermoplastic elastomer material does not sufficiently flow (be filled), which causes insufficient mold of the tooth portion and the back portion.

In the multilayer molding method disclosed in PTL 2, a problem is to secure adhesion at an adhesion interface between layers, and there is a possibility of the occurrence of peeling between layers particularly in the case where a belt having a thick back portion is wound around a pulley and is bent.

The present invention has been made to solve the above-mentioned problem, and an object of the present invention is to provide, in a toothed belt formed by a multilayer manner, a toothed belt and a manufacturing method thereof, capable of providing adhesion sufficient to suppress peeling between layers even in the case of a thickened back portion.

Solution to Problem

In order to solve the above-mentioned problem, the toothed belt according to the present invention is a toothed belt including:

a belt main body containing an array of a cord, a tooth portion formed on the lower side of the array of the cord and arranged at a predetermined interval along a longitudinal direction of the cord, and a back surface portion formed on the upper side of the array of the cord and having the cord buried therein, which are integrally molded with a first thermoplastic elastomer composition; and a back sheet adhered to the back surface portion side of the belt main body and composed of a second thermoplastic elastomer composition, in which the back sheet has an uneven shape in a surface on the adhesion side.

According to the above-described configuration, the surface on the adhesion side of the back sheet has an uneven shape, and thus an area of the interface adhered to the belt main body can be increased and an adhesive force can be increased as well.

In the toothed belt of the present invention, it is preferable that the uneven shape is formed by arranging convex and concave portions along the longitudinal direction of the cord at a predetermined interval, and the predetermined interval of the convex and concave portions is smaller than the predetermined interval of the tooth portion.

According to this configuration, the area of the adhesion interface can be appropriately increased by reducing the predetermined interval of the convex and concave portion.

In the toothed belt of the present invention, the second thermoplastic elastomer composition forming the back sheet may have a different property from that of the first thermoplastic elastomer composition forming the belt main body.

According to this configuration, since the area of the adhesion interface can be increased, the deterioration of the adhesive force due to the difference in properties of the thermoplastic elastomer can be compensated.

Furthermore, a method for manufacturing the toothed belt according to the present invention includes:

a first step of forming the back sheet having the above-mentioned uneven shape, and a second step of fusion-joining the back sheet having the uneven shape and the belt main body while continuously molding the belt main body, including: using a belt-manufacturing apparatus including a molding drum having a tooth-molding groove formed on the outer periphery at a predetermined interval, a pressing band disposed so as to be wound around the outer periphery side of the molding drum, and an extrusion head supplying a thermoplastic elastomer to a cavity formed between the molding drum and the pressing band; rotating the molding drum; and while supplying the array of the cord to the outer periphery of the molding drum, supplying the back sheet having the uneven shape on the inner periphery of the pressing band and simultaneously supplying the thermoplastic elastomer heated and melted from the extrusion head to the cavity.

According to the above-described configuration, the adhesion to the back sheet having an uneven shape and formation of the belt main body can be performed at the same time, and thus an efficient manufacture can be achieved.

In the method for manufacturing the toothed belt according to the present invention, the extrusion head is preferably disposed toward the cavity from between the molding drum and the array of the cord.

According to this configuration, the belt main body can be securely formed.

In the method for manufacturing the toothed belt according to the present invention, the back sheet having the uneven shape is preferably continuously formed by using a belt-manufacturing apparatus including a molding drum having an uneven groove formed on the outer periphery at a predetermined interval, a pressing band disposed so as to be wound around the outer periphery side of the molding drum, and an extrusion head supplying a thermoplastic elastomer to a cavity formed between the molding drum and the pressing band, and by supplying the thermoplastic elastomer heated and melted from the extrusion head to the cavity.

According to this configuration, the back sheet having an uneven shape can be manufactured by using a similar belt-manufacturing apparatus to the manufacturing apparatus of the toothed belt.

Advantageous Effects of Invention

As means for suppressing the occurrence of peeling at the adhesion interface between the back sheet and the belt main body, an uneven shape is provided on the surface of the back sheet on the adhesion side and heat-adhered with the toothed belt main body. In this way, since the adhesion surface of the back sheet has an uneven shape, the area of the adhesion interface with the toothed belt main body increases, which leads to an enhancement of the adhesive force. Accordingly, since a belt having a high strength can be obtained, the occurrence of peeling can be suppressed. Particularly, even in the case where the back sheet is thickened, the occurrence of peeling can be suppressed.

BRIEF DESCRIPTION OF DRAWINGS

FIG. 1 is a side view of a toothed belt of the present invention.

FIG. 2 is a cross-sectional view taken along line A-A in FIG. 1.

FIG. 3 is a schematic side view of a manufacturing apparatus of the toothed belt of the present invention.

FIG. 4 is a schematic side view of a manufacturing apparatus of a back sheet of the present invention.

FIG. 5 is a schematic front view illustrating an application example of the toothed belt of the present invention.

FIG. 6 is a diagram illustrating a shape and dimension of the toothed belt according to Example.

FIG. 7 is a diagram illustrating a shape and dimension of the toothed belt according to Comparative Example.

DESCRIPTION OF EMBODIMENTS

Next, an embodiment of the present invention will be described. The present embodiment will describe an example in which the present invention is applied to a toothed belt used in such a lifting and transporting apparatus in which the toothed belt is provided with a shaft member (fixture) for connecting a loading platform, which is inserted into a belt back portion in order to connect and fix the loading platform with the toothed belt. In this use, the belt back portion is required to be thickened.

In this toothed belt, for convenience, the belt back portion side is defined as the upper side, and the tooth portion side is defined as the lower side.

(Configuration of Toothed Belt)

As illustrated in FIG. 1 and FIG. 2, a toothed belt 1 of the present embodiment contains a belt main body 2 integrally formed by a thermoplastic elastomer, and a back sheet 3 which is adhered to the back surface side of the belt main body 2 and composed of a thermoplastic elastomer.

The belt main body 2 containing: an array of cords (tension member) in which cords 4 are arranged at intervals; tooth portions 2b which are formed on the lower side of the array of cords and are arranged at a predetermined interval P along a longitudinal direction of the cord 4; and a back surface portion 2a which is formed on the upper side of the array of cords and in which the cords 4 are buried, which are integrally molded with a thermoplastic elastomer.

The back sheet 3 is molded with a thermoplastic elastomer in advance. The lower side surface (adhesion surface) of the back sheet 3 has an uneven shape 6. The belt main body 2 is formed of a melted thermoplastic elastomer material supplied. For this reason, the back surface side of the belt main body 2 is adhered to the surface of the uneven shape 6 by thermal fusion. The uneven shape 6 is preferably formed by arranging convex and concave portions at a predetermined interval S along the longitudinal direction of the cord 4. Note that, the surface of the uneven shape 6 is thermally fused.

The predetermined interval S of the uneven shape 6 of the back sheet 3 is preferably smaller than the predetermined interval P of the tooth portion 2b. Specifically, P/S is preferably from 2 to 6. The area of the adhesion interface between the belt main body 2 and back sheet 3 is increased and therefore, the adhesive force can be enhanced.

Furthermore, the height of the convex portion itself of the uneven shape 6 preferably has a height of from about 25% to 60% with respect to a thickness of the thick portion of the uneven shape 6 of the back sheet 3.

The convex and concave portions arranged at the predetermined interval S is formed by, for example, arranging a convex portion with upward trapezoid and a concave portion with downward trapezoid alternately and regularly. This convex and concave portions are preferably formed by trapezoids, but may be a combination of a convex portion with a rectangle and a concave portion with a rectangle, a combination of a convex portion with a semicircle and a concave portion with a semicircle, or the like.

The back portion 5 of the toothed belt 1 has a two-layer structure of the back surface portion 2a of the belt main body 2 and the back sheet 3. In addition, the adhesion interface between the belt main body 2 and the back sheet 3 has the uneven shape 6. Therefore, the thickness of the back portion 5 of the toothed belt 1 can be thickened while securing the bendability of the toothed belt 1.

The predetermined interval P at which the tooth portions 2b are provided is, for example, from 8 to 25 mm. In contrast, the thickness of a thick portion of the uneven shape 6 of the back sheet 3 is, for example, from 2 to 5 mm. The fixture described below can be attached to a part thickened by the amount of the back sheet 3.

(Constituent Materials of Back Sheet and Belt Main Body)

As constituent materials of the back sheet and the belt main body, thermoplastic elastomer compositions which can fusion-join the back sheet 3 and the belt main body 2 laminated and have elasticity, are used.

Examples of the thermoplastic elastomer include polyurethane thermoplastic elastomers, polyester thermoplastic elastomers, polystyrene thermoplastic elastomers, polyolefin thermoplastic elastomers, polyamide thermoplastic elastomers, vinyl chloride thermoplastic elastomers, and the like.

In particular, polyurethane thermoplastic elastomers which are excellent in mechanical properties and durability and are widely used for a power-transmission belt or a conveyor belt, are preferable.

As the polyurethane thermoplastic elastomer, use can be made of a polyether-type, a polyester-type, and a polycarbonate-type.

Furthermore, the hardness of the thermoplastic elastomer can be selected from the range of from 80° to 95° (based on JIS K6253, measured with A type hardness tester).

In addition, a melting temperature of the thermoplastic elastomer can be selected from the range of from 200° C. to 230° C.

The thermoplastic elastomer composition may include conventional additives as necessary, such as a compatibilizer, an antioxidant, a vulcanization accelerator, a plasticizer, a filler, a colorant, a processing aid, and a hydrolysis inhibitor.

For the back sheet 3 and the belt main body 2 to be laminated, the same materials can be used. With this, the adhesive force between the belt main body 2 and back sheet 3 can be enhanced. However, since the area of the adhesion interface between the belt main body 2 and the back sheet 3 is increased, thermoplastic elastomers having different properties, such as different materials and different melting temperatures, may be laminated.

For an example of laminating thermoplastic elastomers of different properties, a polyurethane thermoplastic elastomer excellent in wear resistance and bending resistance is used for the belt main body 2 which has tooth portions; and in the case where the use in a situation where exposure with outside air is assumed or adhesion of chemicals is concerned, a vinyl chloride thermoplastic elastomer, which is excellent in ozone resistance and weather resistance and also excellent in chemical resistance, is used for the back sheet 3 to laminate.

(Constituent Materials of Cord)

As the cord 4, a low elongation and high strength cord made of steel fiber, aramid fiber, polyester fiber, glass fiber, or the like is used. In general, aramid fibers having properties such as high strength, heat resistance and chemical resistance, are preferable. A cord having a cord diameter of, for example, from 0.6 to 2.5 mm can be used.

(Manufacturing Apparatus of Toothed Belt 1)

FIG. 3 illustrates an example of a manufacturing apparatus 30 of the toothed belt 1. The manufacturing apparatus 30 includes a molding drum (mold) 31, a pressing band 32, an extrusion head 33, a cord supplying device which is not illustrated, and a back sheet supplying device which is not illustrated.

The molding drum 31 is provided with: a tooth-molding groove formed at a predetermined interval P on the outer periphery of the tubular shape; a flange which is not illustrated but attached to both ends in an axial direction of the tubular shape to prevent the thermoplastic elastomer from flowing out; a heating means capable of heating the vicinity of the tooth-molding groove from normal temperature to 120° C.; and a driving means for rotatably driving the molding drum 31 in an arrow direction (counterclockwise direction).

The pressing band 32 is an endless metal band wound around pulleys 32a and 32b, which are closely arranged on the upper side and the lower side of the molding drum 31, and a pulley 32c, which is disposed at a position separated from the pulleys 32a and 32b. This metal band is wound around about half of the outer periphery of the not-illustrated flange at both ends of the molding drum 31. The pulley 32c applies a predetermined tension to the pressing band 32 by being moved in the left direction of the drawing. A molding cavity is formed between the pressing band 32 and the molding drum 31.

The extrusion head 33 is disposed in the vicinity of the outer periphery of the molding drum 31 in front of the entrance of the cavity and causes the melted thermoplastic elastomer to flow out toward the cavity. The extrusion head 33 is preferably disposed toward the cavity from between the molding drum and the array of cords. This is because the melted thermoplastic elastomer can be sufficiently supplied to the tooth-molding groove.

The cord supplying device continuously supplies the array of cords, which contains the cords 4 arranged in the axial direction of the molding drum 31 with an interval provided therebetween, to the outer periphery of the molding drum 31.

The back sheet supplying device continuously supplies the back sheet 3 to the outer peripheral side of the pressing band 32 in a direction in which the uneven shape 6 faces the cord 4.

(Manufacturing Apparatus of Back Sheet 3)

FIG. 4 illustrates an example of a manufacturing apparatus 40 of the back sheet 3 having the uneven shape 6. The manufacturing apparatus of the toothed belt 1 illustrated in FIG. 3 can be partially changed and diverted. The same reference numerals as those in FIG. 3 are attached to diverted parts, and a detailed description thereof will be omitted.

Changed parts are the outer peripheral shape of the molding drum 41 and that the cord supplying device and the back sheet supplying device, which are not illustrated, are not used.

The molding drum 41 having an uneven-molding groove formed at the predetermined interval S on the outer periphery of the tubular shape is used. Also a flange, which is not illustrated, having a height matching the thickness of the back sheet is used. The change may be made only on the outer peripheral side or on the whole of the molding drum 41.

By using this molding drum 41, without supplying the cords and the back sheet, only the melted thermoplastic elastomer material is supplied and continuously solidified, whereby a back sheet having an uneven shape can be manufactured. In addition, the configuration of the apparatus can be simplified by diverting most of the apparatus as in this way.

(Method of Manufacturing Toothed Belt 1)

The method of manufacturing a two-layer toothed belt 1 according to the present invention will be described.

First, the back sheet 3 having an uneven shape is molded (first step).

Next, while supplying the back sheet 3 having the uneven shape, the melted material to be the belt main body 2 is supplied from the extrusion head (die) 33 of the extruder and laminated so as to form a two-layer toothed belt 1 (second step).

Details will be described below.

(First Step)

When a thermoplastic elastomer heated and melted is supplied from the extrusion head 33 of the extruder while rotatably driving the molding drum (mold) 41 in the arrow direction in FIG. 4, the thermoplastic elastomer is caught in the cavity between the molding drum 41 and the pressing band 32 in accordance with the rotation of the molding drum 41.

The thermoplastic elastomer is filled in the uneven-molding groove of the molding drum 41 by the pressure from the pressing band 32, whereby the uneven shape 6 of the back sheet 3 is molded and simultaneously, the back surface of the back sheet 3 is molded. The back sheet 3 having the uneven shape can be manufactured by continuously cooling and solidifying the thermoplastic elastomer naturally while molding in this manner.

Manufacturing conditions are, for example, as follows: melting temperature of thermoplastic elastomer: from 200 to 230° C., temperature of molding drum: from normal temperature to 120° C., and feeding speed of molding drum 41: from 0.1 to 1.0 m/min.

(Second Step)

While rotatably driving the molding drum (mold) 31 in the arrow direction in FIG. 3, an array of cords in which a predetermined number of cords 4 are arranged in parallel is supplied to the outer periphery of the molding drum 31 and at the same time, the back sheet 3 having the uneven shape is supplied to the outer peripheral side of the pressing band 32 between the pulley 32a and the molding drum 31.

When a thermoplastic elastomer heated and melted is supplied from the extrusion head 33 of the extruder at the same time as the back sheet 3 having the uneven shape and the cords 4 are caught in between the pulley 32a and the molding drum 31, the back sheet 3 having the uneven shape, the cords 4, and the thermoplastic elastomer are caught in the cavity between the molding drum 31 and the pressing band 32 in accordance with the rotation of the molding drum 31.

The thermoplastic elastomer is filled in the tooth-molding groove of the molding drum 31 by the pressure from the pressing band 32, whereby the tooth portion 2b of the toothed belt 1 is molded and simultaneously, the belt main body 2 of the toothed belt 1 having the cords 4 buried between the back sheet 3 having the uneven shape and the outer periphery of the molding drum 31 is molded. A two-layer toothed belt 1 with an end in which the back sheet 3 having the uneven shape and the belt main body 2 of the toothed belt are integrally fusion-joined can be manufactured by continuously cooling and solidifying the thermoplastic elastomer naturally while molding in this manner. This fusion-joining is performed on the surface of the uneven shape of the back sheet 3, and the uneven shape thereof is maintained.

Manufacturing conditions are, for example, as follows: melting temperature of thermoplastic elastomer: from 200 to 230° C., temperature of molding drum: from normal temperature to 120° C., and feeding speed of cord and belt: from 0.1 to 1.0 m/min.

APPLICATION EXAMPLES

Examples of using such a toothed belt 1 include a lifting and transporting apparatus 50 that reciprocates in a certain range as illustrated in FIG. 5.

In this lifting and transporting apparatus, toothed belts 55 and 56, which are meshed with toothed pulleys 51 and 53 and toothed pulleys 52 and 54 arranged on the upper side and the lower side, are used. The toothed pulley 52 on the lower left side, which is a driving pulley, is rotated/reversely rotated. The other toothed pulleys 51, 53, and 54 are synchronously driven via the toothed belts 55 and 56. As a result, the power is transmitted to the belt mechanism, and a transported object W placed on the loading platform 57 fixed to the two belt mechanisms moves up and down.

For the toothed belts 55 and 56, the toothed belt 1 with an end manufactured as described above is used by being cut into a predetermined width and a predetermined length, and joining both end portions in the length direction to be endless.

A fixture 58 for fixing the loading platform 57 is attached to the toothed belts 55 and 56. An example of this fixture 58 is one in which, as illustrated in FIG. 1 of JP-A 2015-3821, a shaft member and a back plate are arranged and are fixed with screws so as to interpose the belt back portion at between a tooth portion and a tooth portion. Another example of the fixture 58 is one in which, as illustrated in FIG. 6 of JP-A 2009-112217, a through hole is provided in the width direction of the tooth portion, a shaft member is inserted into the through hole, and a nut is screwed into the tip end screw of the shaft member to fix it.

In either example, the back portion of the toothed belt 1 is formed to be thick, and thus it has sufficient mounting strength. In addition, the thickness is increased with the adhesion interface of the uneven shape, and thus there is little possibility of causing peeling at the adhesion interface.

Still another example may be one in which a through hole is provided in the back portion of the toothed belt 1, a shaft member is inserted into the through hole, and a nut is screwed into the tip end screw of the shaft member to fix it.

Although the embodiments of the present invention have been described above with reference to the drawings, specific configurations should be construed as not being limited to these embodiments and examples. The scope of the present invention is indicated not only by the embodiments described above and by descriptions of examples which will be described later but also by the scope of claims, and includes meaning equivalent to claims and all changes within the scope.

EXAMPLES

In accordance with the above-described manufacturing method, two-layer toothed belt according to Example and Comparative Example having the following sizes were manufactured.

Example

This is a two-layer toothed belt having the shape and dimension as illustrated in FIG. 6.

Belt width: 25 mm, thickness of back sheet having uneven shape: 2.5 mm, tooth pitch: 25 mm, total belt thickness: 14 mm, constituent material: thermoplastic polyurethane elastomer (both back sheet and belt main body), and cord diameter: φ1.9 mm (para-aramid fiber "TOWARON (registered trademark)").

Comparative Example

This is a two-layer toothed belt having the shape and dimension as illustrated in FIG. 7.

Belt width: 25 mm, back flat sheet thickness: 2.0 mm, belt tooth pitch: 25 mm, total belt thickness: 14 mm, constituent material and cord diameter: the same as those in Example.

(Test Method)

A test specimen having a length of 125 mm was taken from the manufactured belt and a tensile test (tensile speed: 100 mm/min) was carried out by using a tensile tester (Autograph), and the adhesive force until the sheet was peeled off was compared.

The results are shown in Table 1 below.

TABLE 1

|  | Example Sheet with uneven shape | Comparative Example Flat sheet |
|---|---|---|
| Sheet adhesive force | 555N | 437N |

In the case of the back sheet having an uneven shape, the sheet adhesive force was improved by 27% as compared to the case where the back sheet was a flat sheet.

In addition, in the completed two-layer toothed belt, the interface between the back sheet having the uneven shape and the belt main body was perfectly adhered by fusion-joining in a state where it could not be recognized visually.

The present application is based on Japanese Patent Application No. 2016-104344 filed on May 25, 2016 and Japanese Patent Application No. 2017-097103 filed on May 16, 2017, and the contents thereof are incorporated herein by reference.

REFERENCE SIGNS LIST

1 TOOTHED BELT
2 BELT MAIN BODY
2a TOOTH PORTION
2b BACK SURFACE PORTION
3 BACK SHEET
4 CORD
5 BACK PORTION
6 UNEVEN SHAPE
31 MOLDING DRUM
32 PRESSING BAND
33 EXTRUSION HEAD

The invention claimed is:

1. A toothed belt comprising:
    a belt main body comprising an array of a cord, a tooth portion formed on the lower side of the array of the cord and arranged at a predetermined interval along a longitudinal direction of the cord, and a back surface portion formed on the upper side of the array of the cord and having the cord buried therein, which are integrally molded with a first thermoplastic elastomer composition; and
    a back sheet adhered to the back surface portion side of the belt main body and composed of a second thermoplastic elastomer composition,
    wherein the back sheet has an uneven shape in a surface on the adhesion side, and
    wherein the uneven shape is formed by arranging convex and concave portions along the longitudinal direction of the cord at a predetermined interval, and the predetermined interval of the convex and concave portions is smaller than the predetermined interval of the tooth portion.

2. The toothed belt according to claim 1,
    wherein the second thermoplastic elastomer composition forming the back sheet has a different property from that of the first thermoplastic elastomer composition forming the belt main body.

3. A method for manufacturing the toothed belt as described in claim 1, comprising:
    a first step of forming the back sheet having the uneven shape, and
    a second step of fusion-joining the back sheet having the uneven shape and the belt main body while continuously molding the belt main body, comprising:
        using a belt-manufacturing apparatus including a molding drum having a tooth-molding groove formed on the outer periphery at a predetermined interval, a pressing band disposed so as to be wound around the outer periphery side of the molding drum, and an extrusion head supplying the first thermoplastic elastomer composition to a cavity formed between the molding drum and the pressing band,
        rotating the molding drum, and
        while supplying the array of the cord to the outer periphery of the molding drum, supplying the back sheet having the uneven shape on the inner periphery of the pressing band and simultaneously supplying the first thermoplastic elastomer composition heated and melted from the extrusion head to the cavity.

4. The method for manufacturing the toothed belt according to claim 3,
    wherein the extrusion head is disposed toward the cavity from between the molding drum and the array of the cord.

5. The method for manufacturing the toothed belt according to claim 3,
    wherein the back sheet having the uneven shape is continuously formed:
        by using a belt-manufacturing apparatus including a molding drum having an uneven groove formed on the outer periphery at a predetermined interval, a pressing band disposed so as to be wound around the outer periphery side of the molding drum, and an extrusion head supplying the second thermoplastic elastomer composition to a cavity formed between the molding drum and the pressing band, and
by supplying the second thermoplastic elastomer composition heated and melted from the extrusion head to the cavity.

\* \* \* \* \*